United States Patent [19]

Wiegand et al.

[11] Patent Number: 4,595,144

[45] Date of Patent: Jun. 17, 1986

[54] INJECTION DEVICE, MORE PARTICULARLY FOR DIRECT-INJECTION DIESEL ENGINES

[75] Inventors: Herbert Wiegand, Cologne; Klaus Bäumer, Bonn, both of Fed. Rep. of Germany

[73] Assignee: Deutsche-Forschungs- und Versuchsanstalt fur Luft- und Raumfahrt e.V., Cologne, Fed. Rep. of Germany

[21] Appl. No.: 548,283

[22] Filed: Nov. 3, 1983

[30] Foreign Application Priority Data

Nov. 11, 1982 [DE] Fed. Rep. of Germany ....... 3241679

[51] Int. Cl.⁴ ............................................. F02M 39/00
[52] U.S. Cl. ................................. 239/533.3; 239/408; 239/428.5
[58] Field of Search ...................... 239/533.3, 428.5, 5, 239/8, 294, 407–410, 424, 434.5, 533.2, 533.4–533.12; 123/470, 472, 531, 585

[56] References Cited

U.S. PATENT DOCUMENTS

| | | |
|---|---|---|
| 1,843,821 | 2/1932 | Joslyn . |
| 3,450,349 | 6/1969 | Hamon .............................. 239/428.5 |
| 3,656,693 | 4/1972 | Eckert .............................. 239/424 X |
| 3,799,450 | 3/1974 | Braukman ........................ 239/428.5 |
| 4,177,948 | 12/1979 | Schaffitz et al. ................. 239/533.3 |

*Primary Examiner*—Joseph F. Peters, Jr.
*Assistant Examiner*—Daniel R. Edelbrock
*Attorney, Agent, or Firm*—Spensley Horn Jubas & Lubitz

[57] ABSTRACT

The injection device has a nozzle body with a needle valve controlled by fluid. At the front end of the nozzle body there are, in the case of a single hole nozzle, one injection channel and in the case of a multi-hole nozzle, several injection channels which may be at any angle to each other. In the narrowest cross section of the injection channel suction slots lead into the combustion chamber. Air is drawn in from the combustion chamber by the jet of fuel leaving the injection channel. This air mixes with the fuel in the narrowest cross section of the injection channel so that, at the base of the injection jet, there is a two-phase flow having particularly favorable properties for the subsequent mixture formation.

14 Claims, 7 Drawing Figures

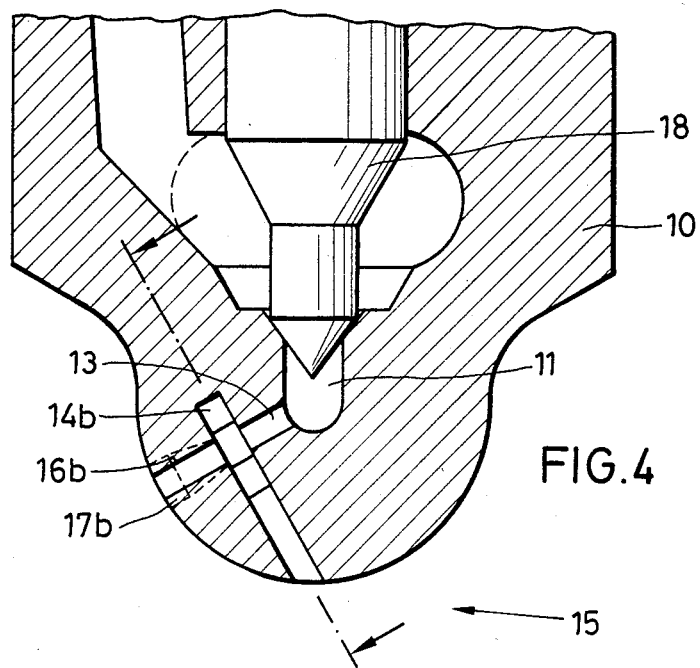
FIG. 4
FIG. 5
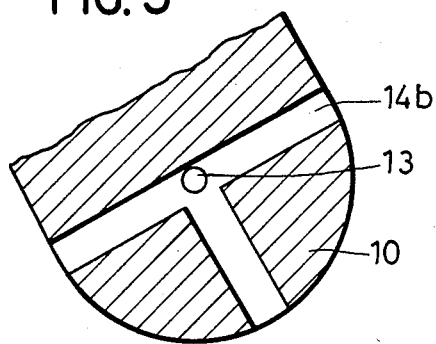
FIG. 6
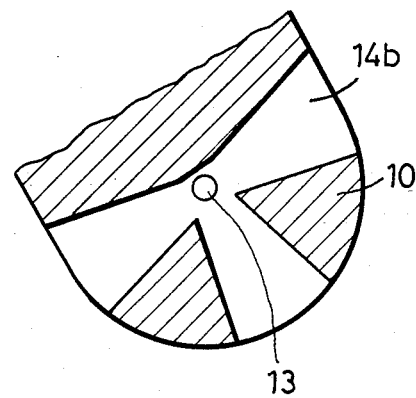
FIG. 7
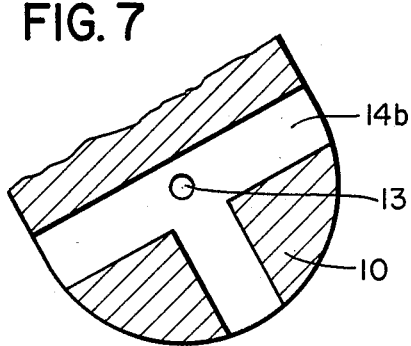

INJECTION DEVICE, MORE PARTICULARLY FOR DIRECT-INJECTION DIESEL ENGINES

BACKGROUND OF THE INVENTION

1. Field of the Invention

The invention relates to an injection device, more particularly for direct-injection diesel engines.

2. Description of the Related Art

For the injection of fuel into the combustion chamber of a diesel engine, the aim is to draw in highly compressed air out of the combustion chamber by the suction of the diesel injection jet in the narrowest cross section of a spray aperture and to effect introduction into the combustion chamber as a two-phase flow directly at the outlet of the spray aperture or via a diffuser connecting with this spray aperture and having a cylindrical section, so that an explosive mixture is produced continuously during the injection process.

It is known that, in order to achieve an explosive mixture in the diesel engine, high air velocities are desirable which are to be achieved by the momentum exchange between the injection jet and the air and a suitable air control. It has been shown in this connection that it is mainly the jet tip which is involved in the momentum and material exchange and, according to previous studies, an increase in the injection pressure was shown to some extent not in an increase but actually in a reduction of the jet tip velocity. It is known from engine tests that high pressure injection during diesel engine operation leads to reduced $NO_x$ formation. More particularly, no evidence could be found on the basis of previous tests that the injection pressure affects the ignition lag.

SUMMARY OF THE INVENTION

The underlying object of the invention is to draw in air continuously by the suction of the injection jet in the narrowest cross section of the spray aperture and to use the momentum in the injection jet deliberately to produce a two-phase flow. In this way the greater jet momentum available during high pressure injection should also be used for improving the mixture preparation.

This object is achieved according to the invention by the fact that the injection jet draws in compression air from the combustion chamber of a diesel engine in the narrowest cross section of a spray aperture via a slot nozzle and enters the combustion chamber as a two-phase flow at the end of the spray aperture which may be provided with a diffuser having a cylindrical section. As in the case of the one known injection device, the propulsion jet is abruptly cut off when the needle valve is closed. However, the more slowly abating suction action of the air should also still be sufficient here to draw out any residual volume of fuel from the spray aperture and blind hole and inject it into the combustion chamber while the combustion process is still in progress.

While the geometry of the injection device for diesel engines also makes it suitable for drawing in larger volumes of air, this is no longer the case with the injection device operating according to the Venturi method, as here the principle requires that the suction slots lie in the narrowest cross section of the spray aperture. On the other hand, it is known from the operation of Venturi tubes that the suction action occurs suddenly after the build up of the propulsion jet flow and there is no interruption of the suction jet flow, such as can easily occur with ejectors when operating conditions vary from the design starting point.

BRIEF DESCRIPTION OF THE DRAWINGS

An exemplary embodiment of the invention is represented in the drawing and is described in more detail in the following.

FIG. 4 shows a like injection device having plural injection channels or spray apertures 13 arranged at angles to the nozzle axis, only one of which is seen in the cross-section of FIG. 4. Suction slots 14a; 14b out of which the fuel injection jet draws in air from the combustion chamber 15, are located in the narrowest cross section in the spray apertures 12 and 13. At the end of the spray apertures 12 and 13 the injection jet enters the combustion chamber 15 as a two-phase flow as a result of the admixture of air. In order to achieve optimal conditions in the spray apertures 12 and 13 for producing the mixture, a diffuser-type enlargement 16a; 16b with a cylindrical section 17a; 17b may be connected after these apertures.

FIGS. 5, 6 and 7 represent alternative arrangements of the suction slots 14b around the injection channels 13 of FIG. 4, wherein one of the injection channels may have suction slots which are of a different cross-sectional size than the suction slots of the other channel, as illustrated in FIGS. 5 and 7. FIG. 6 shows an optional nozzle cross-sectional arrangement.

DESCRIPTION OF THE PREFERRED EMBODIMENTS

Figure 1:
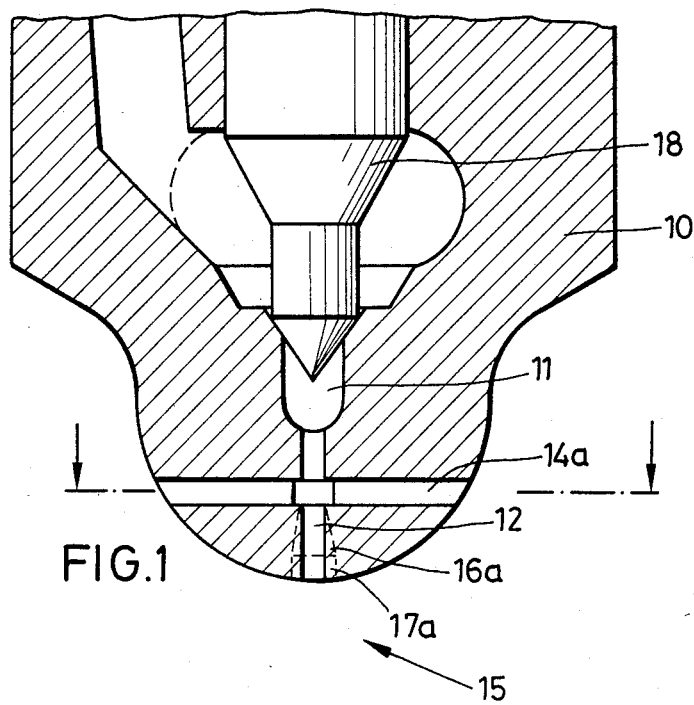
FIG. 1 shows a longitudinal section through an injection device, consisting of a nozzle body 10 with a needle valve 18, a blind hole 11, a central spray aperture or injection nozzle 12.
Figure 2:
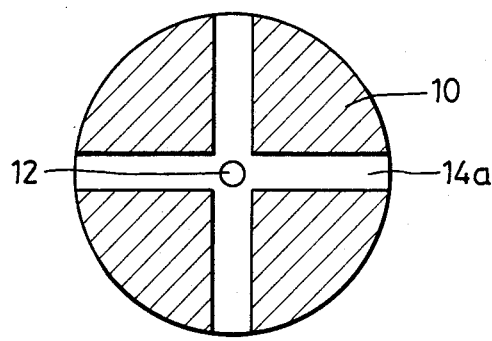
FIG. 2 shows one possible arrangement of the suction slots 14a around the spray aperture 12.
Figure 3:
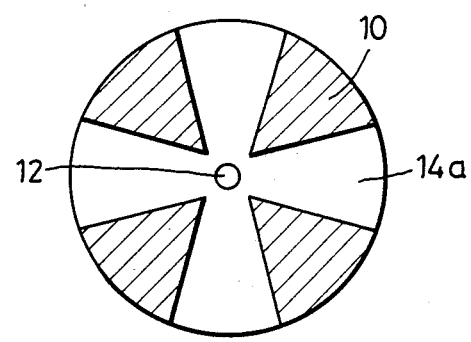
FIG. 3 represents an alternative arrangement of the suction slots 14a around the spray aperture 12 which is particularly advantageous for the flow, although its production cost is somewhat higher.

The advantages achievable with the invention consist more particularly in the fact that a two-phase flow is produced by the continuous addition of air to the fuel jet at a low relative velocity, and this avoids a sudden burning off, such as may occur after a larger amount of fuel is introduced into a combustion chamber. It is known that a sudden burn off leads to a rise in pressure with a high peak pressure and high $NO_x$ emission.

With the aid of an injection device according to the Venturi principle it should be possible, as in the M process (film-like addition of the fuel at the combustion chamber wall) to achieve gentle rises in pressure and low peak pressures, in conjunction with quiet running at high mean pressures and low $NO_x$ formation, by continuous mixture preparation during the injection process. As it is not necessary for the fuel to be added at the wall when an injection device operating according to the Venturi principle is used, because of the presence of a two-phase flow, the known disadvantages of the M process with a cold engine do not occur. It is known with this process that, with a cold engine, the adverse evaporation conditions at the wall lead to cold start difficulties and to an increased emission of unburned hydrocarbons. The injection device described according to the invention allows the combustion and engine operation in the direct-injection diesel engine to be as smooth as in the precombustion chamber diesel engine, without having its drawbacks, such as higher fuel consumption.

A further advantage of the injection device according to the invention is that the air movement caused by the suction slots avoids localized overheating in the nozzle vicinity and this prevents coking of the nozzle outlet bores. If the suction slots are manufactured by electrical discharge machining, for example, their geometric shape may be freely selected within wide limits, which allows the course of the mixture formation to be deliberately controlled in terms of time and space. In this connection, in the case of a multi-hole nozzle the suction slots may have cross sections of various sizes for the individual spray apertures, so that both the strength and the penetration depth of the individual injection jets can be prescribed. Even with the highest injection pressures, which are necessary for the required short injection times, this enables injection jets of reduced strength and different penetration depth to be produced deliberately at the same injection pressure so that, with one injection device provided with several spray apertures, the intensive stratification of charge for an optimum mixture formation can thus be achieved in the combustion chamber of a diesel engine with direct fuel injection.

Furthermore, when the needle valve 18 is closed, the suction action of the air which is still briefly present enables the residual fuel still in the spray aperture and blind hole to be drawn off and reach the combustion chamber while the combustion process is still in progress.

With the aid of theoretical arrangements and parameters which can be determined from tests, an injection device according to the Venturi principle can be designed so that a two-phase flow is produced with optimal ignition conditions for a combustion chamber of prescribed size and geometry.

We claim:

1. An injection device for fuel injection more particularly for direct-injection diesel engines, comprising:
   a multi-hole nozzle in which the nozzle injection channels are at an angle to the nozzle axis, wherein the suction action of the fuel jet is used to continuously draw in air through a plurality of suction slots provided for each injection channel, said suction slots ending in the narrowest cross-section of each injection channel, during the injection process and, by mixing air with the fuel all the way to the end of the injection channel, a two-phase flow of air admixed with fuel is produced, said two-phase flow penetrating the combustion chamber of the engine; and
   the suction slots for at least one individual injection channel are of a different predetermined cross-sectional size with respect to the size of the suction slots for another injection channel, whereby the strength and penetration depth of each individual injection jet of each injection channel is adjusted independently according to the predetermined size of the respective suction slots, and thus a stratification of charge is achieved in the combustion chamber.

2. The injection device according to claim 1 further including a selectively actuated needle valve which, when activated, admits fuel under pressure into said injection channel via an interior blind hole in said device, and wherein, after the needle valve is actuated, any fuel residue still present in the blind hole and the injection channel is drawn off by the still present suction action of the air entering through the suction slots and consequently such fuel residue reaches the combustion chamber while the combustion process in still in progress.

3. The injection device according to claim 1 wherein in order to achieve optimal mixture forming conditions for forming a two-phase flow, each injection channel includes a diffuser-like enlargement having a cylindrical mixing section adjacent to the engine combustion chamber.

4. The injection device according to claim 1 wherein the suction slots have a varying cross sectional shape to act as nozzles, in order to accelerate the air to be drawn therethrough.

5. An injection device for direct fuel injection into the combustion chamber of a diesel engine, comprising:
   at least one injection channel extending into the combustion chamber and providing a fuel jet in the combustion chamber, and
   for each injection channel, a plurality of suction slots extending from the combustion chamber into the respective injection channel and ending in the narrowest cross section thereof, and wherein;
   the suction slots are of such a dimension that air is absorbed through them in an amount sufficient both to form a combined two-phase flow of air admixed together with the fuel all the way to the end of the injection channel and to permit, by said dimensioning, control of combustion in said chamber.

6. The injection device according to claim 5 wherein the suction slots are of varying cross-section to act as nozzles.

7. The injection device according to claim 5 wherein for a multiple-injection-channel nozzle, the suction slots for one or more certain individual injection channels have a cross section different in size from the suction slots of another individual injection channel.

8. The injection device according to claim 7 wherein the injection channels are provided with a respective diffuser-type enlargement with a cylindrical mixing portion fitted at the end thereof.

9. An injection device for fuel injection into a combustion chamber, comprising at least one injection channel through which a fuel stream flows from a fuel inlet area into the combustion chamber, and a respective plurality of suction slots extending from the combustion chamber into each of said channels, air drawn in via said suction slots by suction during the injection process mixing with the fuel stream to produce a two phase flow of air admixed with fuel all the way to the end of the injection channel, each injection channel having a diffuser-type enlargement located downstream of said suction slots.

10. The injection device of claim 9 wherein said suction slots are of varying cross-section to act as nozzles in order to accelerate the air to be drawn in therethrough.

11. The injection device of claim 9 wherein said suction slots end in the narrowest cross section of said respective injection channels.

12. An injection device for fuel injection into a combustion chamber, comprising at least one injection channel extending from a fuel inlet area into the combustion chamber, and for each injection channel, a plurality of suction slots extending from the combustion chamber and into the portion of the respective injection channel which is midway between the fuel inlet area and the combustion chamber, and which is further the area of the injection channel with the narrowest cross section, air drawn in via said suction slots by suction during the injection process mixing with the fixed stream so that a two phase flow of air admixed with fuel is produced all the way to the end of the injection channel.

13. The injection device of claim 12 wherein each injection channel has a diffuser-type enlargement in the portion thereof which is adjacent to the combustion chamber.

14. The injection device of claim 12 wherein said suction slots are configured with tapering cross-section to act as nozzles in order to accelerate the air to be drawn therethrough.

* * * * *